United States Patent [19]
Robert

[11] 4,222,638
[45] Sep. 16, 1980

[54] ARRAY OF OPTICAL GATES

[75] Inventor: Jacques Robert, Saint Egreve, France

[73] Assignee: Commissariat a l'Energie Atomique, Paris, France

[21] Appl. No.: 940,840

[22] Filed: Sep. 8, 1978

[30] Foreign Application Priority Data

Sep. 19, 1977 [FR] France ............... 77 28175

[51] Int. Cl.³ .................................. G02B 5/14
[52] U.S. Cl. ........................ 350/96.14; 350/150; 350/355; 350/356
[58] Field of Search ............ 350/96.12, 96.14, 96.11, 350/96.13, 355, 356, 150

[56] References Cited

U.S. PATENT DOCUMENTS 3,695,745  10/1972  Furukawa ................ 350/96.14
4,157,860  6/1979  Marcatili ................ 350/96.14

OTHER PUBLICATIONS

E. A. Ash et al., "Switchable Optical Waveguide", in *IBM Tech. Disc. Bulletin*, vol. 14, No. 3, Aug. 1971.

*Primary Examiner*—Stewart J. Levy

[57] ABSTRACT

In order to modify the characteristics of light which passes through a plate of electrooptical material such as PLZT ceramic, at least two conductive strips are arranged on each face in displaced relation to the strips on the other face and are connected on each face to different voltage sources. A diagonal electric field is produced between two opposite and relatively displaced strips, thus producing a considerable non-linear variation in transmitted light intensity according to the voltage applied.

8 Claims, 7 Drawing Figures

ARRAY OF OPTICAL GATES

This invention relates to an optical gate as well as to an array of gates. The optical gates under consideration are employed for the purpose of modifying the characteristics of light which passes through a plate in order to produce a variation in polarization or amplitude of the vibration which passes through said plate at right angles to its two parallel faces. The plate is placed for example between two crossed polarizers in such a manner as to ensure that the light transmitted through the system as a whole is of zero amplitude when no excitation is applied. When opening of the gates is initiated, part of the light is transmitted at points corresponding to said gates.

The invention is thus concerned with an array of optical gates formed by a plate of material having optical properties which vary as a function of an excitation produced by an electric field, a ferroelectric material being employed by way of example. Conductive strips connected to different voltage sources are arranged on both faces of the plate, the strips of one face being displaced with respect to the strips of the other face. In consequence, the plane which passes through the axis of two strips located on two opposite faces is inclined with respect to the direction of propagation of light. An electric field is thus present between two relatively displaced strips, the direction of said field being inclined with respect to planes which are perpendicular to the two faces. Assuming by way of example that the material chosen is of the type having electrically induced birefringence such as PLZT 9/65/35 (hot-pressed lanthanum-doped lead zirconate and titanate ceramic material) and that a plate of this material is placed between a crossed polarizer and analyzer, the direction of the electrodes or in other words of the strips being located at an angle of 45° with respect to the directions of polarization, the intensity I transmitted as a function of the applied electric field E is equal to:

$$I = I_0 \sin^2 \frac{\pi}{2} \left(\frac{E}{E_0}\right)^2$$

where $E_0$ is the intensity of the field corresponding to the first peak value of transmitted light. The electro-optical phenomenon does not have any threshold but is highly non-linear. For example, in the case of the following values of E, $E_1 = E_0$ and $E_2 = E_0/3$, the ratio of intensities $I_1$ and $I_2$ respectively transmitted is $I_1/I_2 = 33$; when $E_1 = 0.9 E_0$ and $E_2 = 0.3 E_0$, the ratio $I_1/I_2 = 46$. The voltage which induces the field $E_0/3$ can be considered as the threshold voltage $V_s$ of the electrooptical phenomenon.

The birefringence induced by said voltage $V_s$ or the field $E_0/3$ can be compensated by means of a birefringent plate of a uniaxial medium of opposite sign in order to bring the transmitted intensity back to 0. The contrast is thus considerably improved by eliminating the parasitic phenomenon induced by the threshold voltage. It is necessary to ensure that the thickness e of said birefringent plate and its birefringence $\Delta n_1$ are such that:

$$\Delta n_1 \cdot e = A \frac{E_0^2}{9} L$$

where L is the thickness of the ceramic plate and A is a coefficient of proportionality which is characteristic of the electrooptical effect in the ceramic plate. The device in accordance with the invention is applicable to all types of plates formed of material in which the electrooptical characteristic is non-linear, especially PLZT plates which operate either in the birefringent mode or in the light-scattering mode. The invention is also applicable to liquid crystals and to electrooptical materials which exhibit the Kerr or Pockels effects. As will become apparent hereinafter, the device in accordance with the invention makes it possible to reduce the number of control leads required for an optical gate array. The invention is highly advantageous in practice since it has been shown in the first place that the birefringence induced by the diagonal field is only slightly lower than the birefringence induced by an electric field parallel to the surface of the plate, at least in the case of plate thicknesses of the same order as the distance between two consecutive strips and in the second place that the transmitted light intensity exhibits considerable non-linear variation according to the voltage applied.

Further properties and advantages of the invention will become more readily apparent from the following description of exemplified embodiments which are given by way of explanation and not in any limiting sense, reference being made to the accompanying drawings, wherein.

Figure 1:
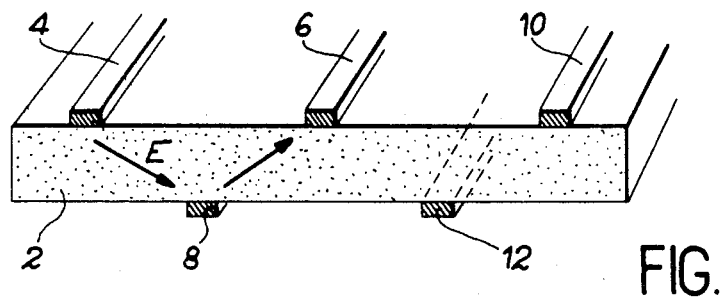
FIG. 1 is a diagrammatic view showing the arrangement of the strips on an electrooptical plate.

There is illustrated in FIG. 1 a device in accordance with the invention in which a plate 2 of electrooptical material (PLZT) is associated with strips such as those designated by the reference numerals 4, 6, 8, 10 and 12. These strips constitute electrodes and are connected to voltage sources (not shown in the drawings) in such a manner as to ensure that the potential difference between two strips such as those designated by the reference numerals 4 and 8, for example, induces a diagonal electric field E as shown diagrammatically and resulting in birefringence of the plate which is controlled by the value of said field. The device in accordance with the invention is characterized by the presence of the strips on both sides of the plate as well as by the existence of a diagonal field.

Theoretical determinations which have been verified experimentally show that the variation in optical path $\Delta n L$ in the material which corresponds to the transmitted light intensity $$I = I_0 \sin^2 \frac{\pi \Delta n L}{\lambda}$$

has a peak value which is highly flattened as a function of L/p; the thickness L of the plate and the distance 2p between two successive strips of one and the same face are related by the inequalities $0.5 < L/p < 1$.

Figure 2:
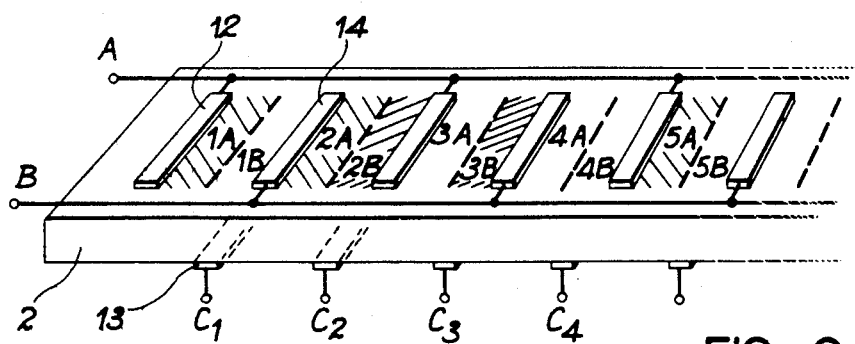
FIG. 2 is a wiring diagram showing the connection of a number of different strips for the control of the optical gates.
Figure 3:
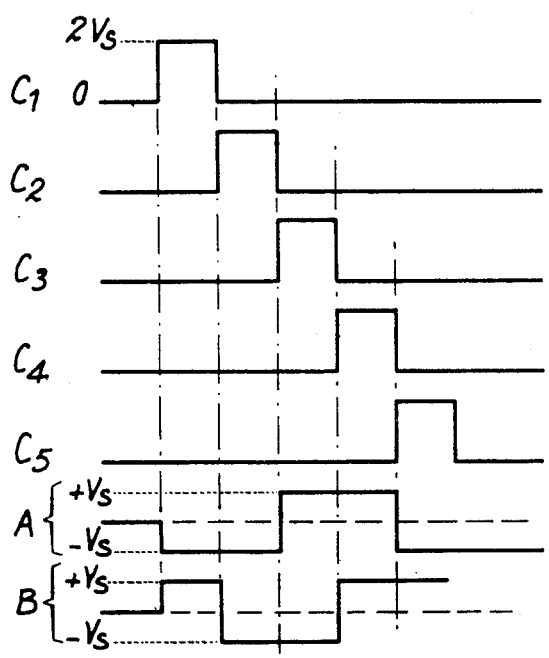
FIG. 3 is a time-function diagram of the potentials applied to the different strips.

FIG. 2 illustrates one advantageous mode of connection of the strips in accordance with the invention. The strips designated by the reference A on one face of the plate 2 are connected to a first voltage supply (not shown in the figure) and the same applies to the interposed strips B whereas the strips C on the other face of the plate 2 are each connected to a different supply. As will be seen with reference to FIG. 3, it is thus possible to carry out multiplexing of the type $V_S$, $3V_S$. This in fact consists in applying a potential $+V_S$ or $-V_S$ to the electrodes A, the same type of potential to the electrodes B and a potential which is equal either to zero or to $2V_S$ to the electrodes C. Since the distance between two strips such as 12 and 14 is greater than the distance between the two strips 12 and 13 in respect of the same potential difference applied between the two strips 12 and 14, the field will be of lower value. Thus in one configuration, the potential $-V_S$ is applied to the strip A, the potential $+V_S$ is applied to the strip B and the potential $2V_S$ is applied to the strip C. The result thereby achieved is that the diagonal field between the strip 12 and the strip 13 is produced by the potential $3V_S$, thus corresponding to a diagonal electric field which induces a high degree of birefringence. In consequence, the shaded portion shown in FIG. 2 is in the "on" position. On the other hand, the potential between the strips 12 and 14 is equal to $2V_S$ but the distance is greater, with the result that the field E is insufficient to put the straight portion of the interval between the strips 12 and 14 in the "on" position. Similarly, the potential difference between the strips 13 and 14 is equal only to $V_S$, thus producing a field which is below the threshold value. The same principle is again applied in the same manner along the entire plate in which the shaded positions correspond to "on" positions, thus resulting in the following sequence: the gate 1A is put in the "on" position, the gate 1B in the "off" position, the gates 2A and 2B in the "on" position, the gate 3A in the "off" position, the gate 3B in the "on" position, the gates 4A and 4B in the "off" position, the gate 5A in the "on" position, the gate 5B in the "off" position, and so forth, depending on the potentials applied to the strips A, B and C as shown in the diagram of FIG. 3. This diagram shows the potentials applied to the different electrodes C and at the same time to the electrodes A and B in order to obtain the open and closed positions of the gates shown in FIG. 2. These potentials can be applied by means of electric generators which may be of conventional type and therefore do not need to be described in detail.

This simple technique already reduces the number of connections required, with the result that only $N/2+2$ leads are in fact employed for N gates.

Figure 4:
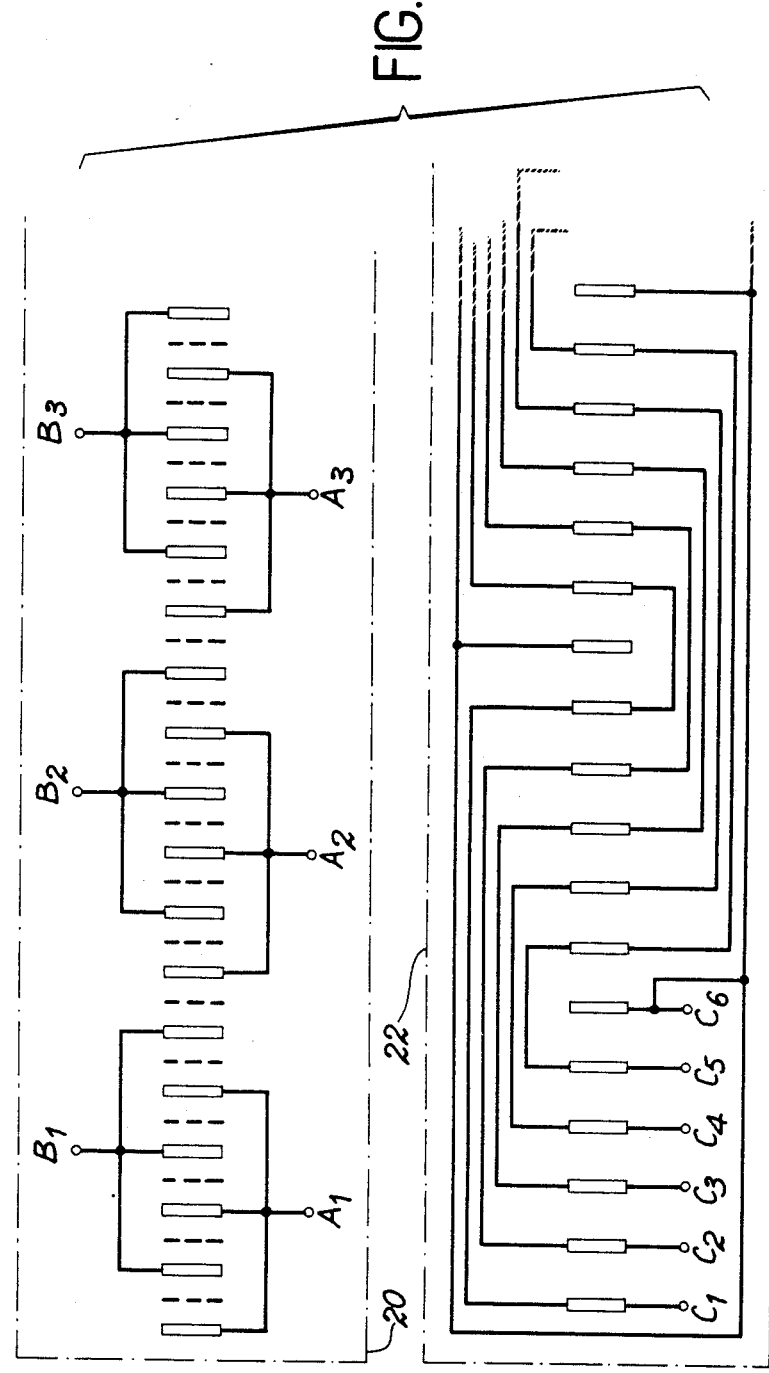
FIG. 4 is another wiring diagram showing the connections to the strips located on the two faces of the plate.

There is shown in FIG. 4 another embodiment of the invention in which the strips are grouped together in a different manner on each face 20 and 22 of the electro-optical plate. Each array of strips comprises electrodes of type A and electrodes of type B. A number y of electrodes of type C corresponds to each array $A_i$ and $B_i$. These y electrodes of each array $A_i$ and $B_i$ can be interconnected in such a manner as to have only y electrodes of type C. There are therefore 2x top electrodes of type AB and y electrodes of type C. This accordingly defines 2xy points or optical gates in respect of $2x+y$ leads and y sequences. In order to permit linear analysis of the strip, sensitization of the terminals $C_y$ is performed sequentially in the following order: $C_1$, $C_2$, $C_3$, $C_4$, $C_5$, $C_6$. This type of sensitization is well known in liquid crystals.

Figure 5:
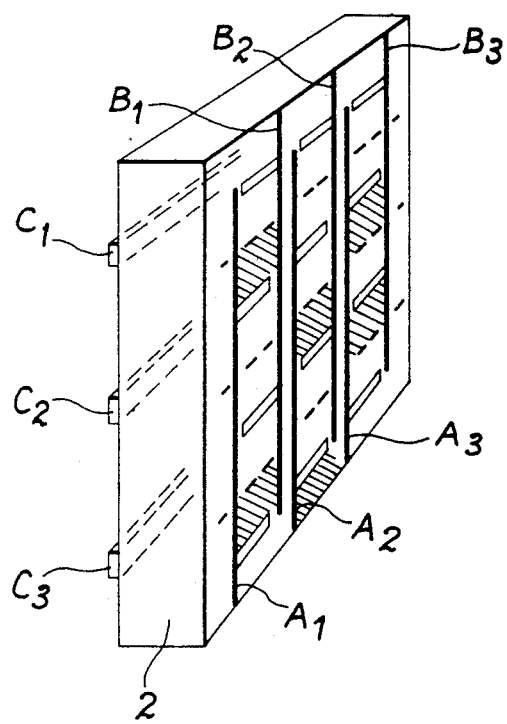
FIG. 5 shows another arrangement of the strips for the formation of optical images.

FIG. 5 shows a matrix array of optical gates in which the operation is exactly as described with reference to FIG. 4 but in which the arrangement of the electrodes is different.

Figure 6:
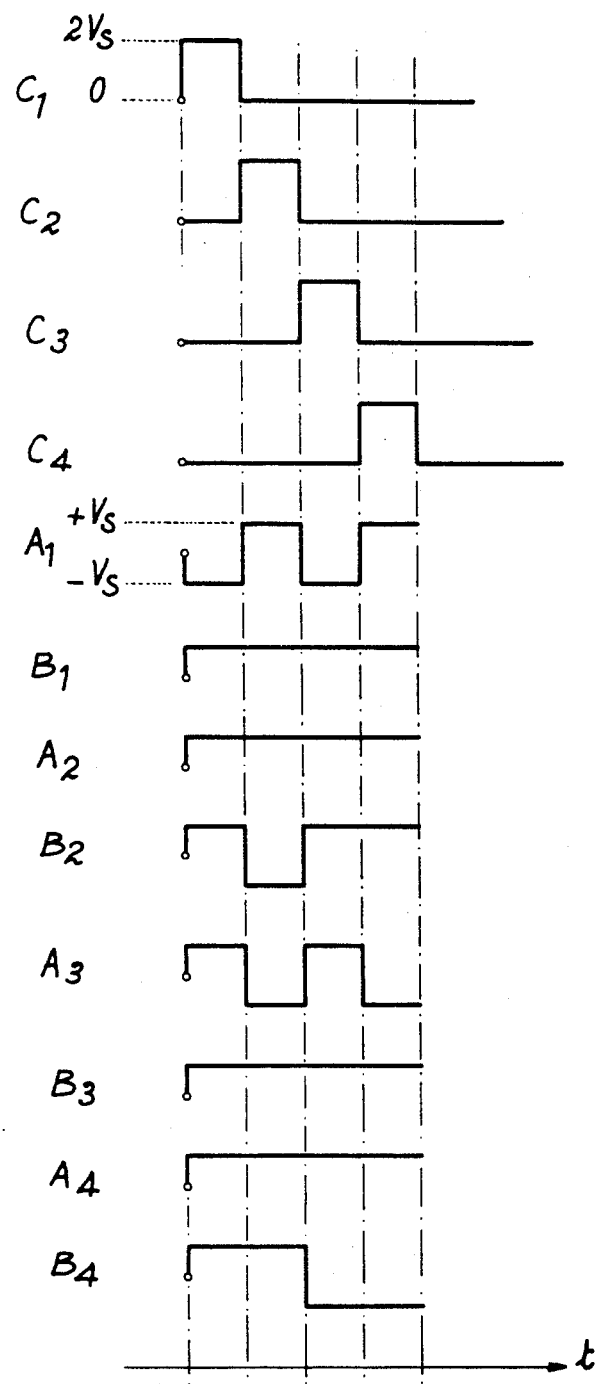
FIG. 6 is a time-function diagram of excitation of the different strips shown in FIG. 5.

There are shown in FIG. 5 electrodes $C_1$, $C_2$, $C_3$ on one face of the plate 2 and the arrangement of the electrodes $B_1$, $B_2$, $B_3$ and so forth on the other face, these latter being intercalated between the electrodes $A_1$, $A_2$, $A_3$ and so on. The shaded "on" zones shown in FIG. 5 correspond to the diagram of excitation in respect of potentials applied to the different electrodes shown in FIG. 6 as a function of time. The electrodes C have a potential which varies between 0 and $2V_S$ and the electrodes A and B have a potential which varies between $-V_S$ and $+V_S$. The display shown in FIG. 5 is obtained by means of the potential applied in accordance with the diagram of FIG. 6.

Figure 7:
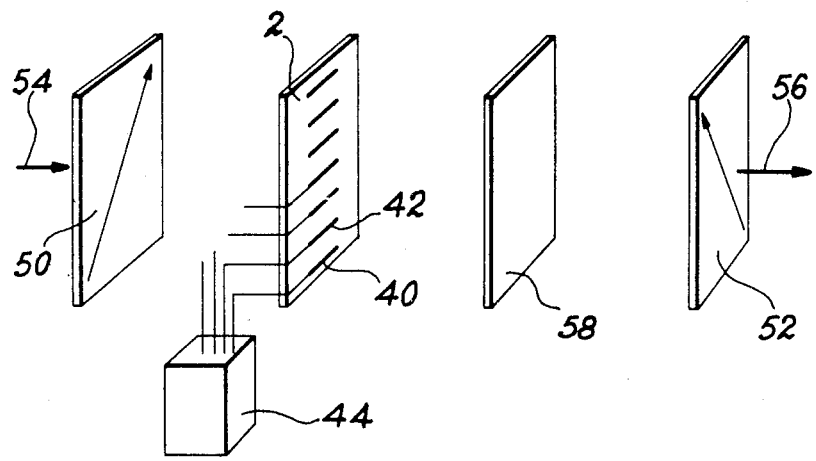
FIG. 7 shows a conventional device in which the optical gate control device in accordance with the invention is inserted.

In FIG. 7, there is shown a device for the practical application of the invention in which the plate 2 is provided with strips such as those designated by the references 40, 42 and so forth, said strips being connected to a programmed voltage supply 44 of conventional type, said plate being placed between an analyzer 50 and a polarizer 52. The light travels from left to right in the direction represented by the arrows 54 and 56. Provision can also be made for a uniaxial plate 58 for introducing an optical path variation which is equal but of opposite sign with respect to the variation introduced by application of the potential $V_S$ corresponding to the diagonal threshold electric field between two strips, thus considerably increasing the contrast as noted earlier.

What we claim is:

1. An optical gate for producing a variation in the characteristics of light passed through two parallel faces which limit a plate of electro-optical material, said optical gate comprising: at least two conductive strips of a first and second type, said strips being placed on opposite faces of the plate and connected to two different voltage sources, said two strips being so arranged that the plane which passes through their axes is inclined with respect to the direction of the light, said plate being a PLZT ceramic material.

2. An optical gate according to claim 1, wherein said plate is placed between two crossed polarizers.

3. An optical gate according to claim 1, wherein a birefringent plate is interposed between the ceramic material plate and a polarizer.

4. An optical gate according to claim 3, wherein the thickness L of the plate and the distance P between the two strips as measured in the direction at right angles to the light path are related by the inequalities $0.5 < L/P < 1$.

5. A linear array of optical gates according to any one of claims 1, 2, 3 or 4, wherein the strips of the first type form an assembly on one face of the plate and are each connected to an addressing voltage source, the strips of the second type being such as to form two other intercalated assemblies of strips connected together in pairs, said two other assemblies being each connected to a control voltage source so that a strip of the first type and two consecutive strips of the second type respectively forming part of the two other assemblies form two optical gates whose state is dependent on the control voltages applied to each consecutive strip of the second type and on the addressing voltage applied to the corresponding strip of the first type.

6. A linear array of optical gates according to claim 5, wherein said array comprises a plurality of assemblies of strips of the first and second types, at least one strip of the first type of each of said assemblies being connected to one and the same addressing voltage source.

7. A matrix array of optical gates comprising juxtaposed linear arrays of gates according to claim 6 said strips of the first type being common to all said linear arrays and the strips of the second type being connected in pairs to two control leads forming part of each linear array.

8. A matrix array according to claim 7, wherein said two control leads of each linear array are placed on that face of the electrooptical material which carries the strips of the second type.

* * * * *